United States Patent
Hsu (10) Patent No.: US 11,269,242 B2
(45) Date of Patent: Mar. 8, 2022

(54) ADJUSTING MODULE AND PROJECTOR (71) Applicant: Coretronic Corporation, Hsin-Chu (TW)

(72) Inventor: Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/203,747

(22) Filed: Mar. 17, 2021

(65) Prior Publication Data
US 2021/0294188 A1 Sep. 23, 2021

(30) Foreign Application Priority Data

Mar. 18, 2020 (CN) .......................... 202020340279.9
Oct. 23, 2020 (CN) .......................... 202022381390.5

(51) Int. Cl.
*G03B 21/14* (2006.01)
*G02B 7/02* (2021.01)

(52) U.S. Cl.
CPC .......... *G03B 21/142* (2013.01); *G02B 7/023* (2013.01); *G03B 21/145* (2013.01)

(58) Field of Classification Search
CPC ...... G03B 21/00; G03B 21/14; G03B 21/142; G03B 21/145; G02B 7/022; G02B 7/023
(Continued)

(56) References Cited

U.S. PATENT DOCUMENTS

| 4,832,452 A * | 5/1989 | Eisler | ...................... | G01M 11/04 |
| | | | | 359/813 |
| 6,262,853 B1 * | 7/2001 | Takanashi | .............. | G02B 7/005 |
| | | | | 359/703 |

(Continued)

FOREIGN PATENT DOCUMENTS

| TW | 200717167 | 5/2007 |
| TW | 200903138 | 1/2009 |
| WO | 2018090767 | 5/2018 |

OTHER PUBLICATIONS amazon.de, "AmScope SE306R-P-LED Compact Stereo Microscope with Multiple Lenses, Angled Head, Metal Column Stand, Top and Bottom LED Lighting, 20X-40X", Oct. 12, 2021, Available at: https://www.amazon.de/SE306R-P-LED-Binokulares-Stereomikroskop-Metallrahmen-eingebautes/dp/B005ANZHVE?currency=EUR&language=e%E2%80%A6.

(Continued)

*Primary Examiner* — William C. Dowling
(74) *Attorney, Agent, or Firm* — JCIPRNET (57) ABSTRACT

An adjusting module and a projector are provided. The adjusting module includes a frame, an optical assembly, an elastic assembly and an adjusting member. The optical assembly is fixed to the elastic assembly. The elastic assembly is detachably assembled on the frame, and includes a fixing portion, a first elastic portion and a second elastic portion. The fixing portion is fixed to the optical assembly. The first and second elastic portions respectively include first and second hooks and first and second elastic arms. The first and second elastic arms are respectively connected to the fixing portion, and the first and second hooks are respectively assembled to the frame. The adjusting member penetrates through the through hole and leans against the optical assembly. When the adjusting member is adjusted, the optical assembly is displaced relative to the frame in a plane perpendicular to an incident optical axis.

11 Claims, 11 Drawing Sheets

(58) Field of Classification Search
USPC ............... 353/100, 101; 359/811, 813, 819
See application file for complete search history.

(56) References Cited

U.S. PATENT DOCUMENTS

| | | |
|---|---|---|
| 2005/0117127 A1 | 6/2005 | Jang |
| 2008/0204904 A1* | 8/2008 | Mizuno ............... G03F 7/70825 |
| | | 359/811 |
| 2012/0063017 A1 | 3/2012 | Song |

OTHER PUBLICATIONS

"Search Report of Europe Counterpart Application", dated Sep. 15, 2021, p. 1-p. 5.

* cited by examiner

ADJUSTING MODULE AND PROJECTOR

CROSS-REFERENCE TO RELATED APPLICATION

This application claims the priority benefit of China application serial no. 202020340279.9, filed on Mar. 18, 2020 and 202022381390.5, filed on Oct. 23, 2020. The entirety of the above-mentioned patent applications are hereby incorporated by reference herein and made a part of this specification.

BACKGROUND

Technical Field

The disclosure relates to an adjusting module and a projector, and particularly relates to an adjusting module capable of adjusting a position of an optical assembly and a projector using the adjusting module.

Description of Related Art

Generally, in manufacture and production of projectors, since manufacture of an optical engine body and processing accuracy of mechanical parts have certain manufacturing tolerances, after components are assembled, a position where a light beam is incident to a light entrance of an integration rod may be deviated from an originally designed optimized position. In this case, if it is required to optimize optical efficiency, a relative position between the incident light and the light entrance of the integration rod may be adjusted to make the incident light to enter the integration rod as much as possible, thereby reducing a loss of the incident light. However, since lenses currently placed in setting grooves are all fixed by elastic pieces, it is unable to displace positions of the lenses. Therefore, a current method for adjusting the relative position between the incident light and the light entrance of the integration rod is only to adjust displacement of the integration rode relative to the incident light.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to an adjusting module, which is adapted to displace an optical assembly relative to a frame in a plane perpendicular to an incident optical axis, so as to adjust the optical assembly to an optimal position.

The disclosure is directed to a projector, which includes the aforementioned adjusting module, and has better projection quality.

In order to achieve one or a portion of or all of the objects or other objects, an embodiment of the disclosure provides an adjusting module including a frame, an optical assembly, an elastic assembly and at least one adjusting member. The optical assembly is fixed to the elastic assembly. The elastic assembly is detachably assembled on the frame, and the elastic assembly includes a fixing portion, a first elastic portion and a second elastic portion. The fixing portion is fixed to the optical assembly. The first elastic portion includes a first hook and a first elastic arm connected to each other. The first elastic arm is connected to the fixing portion, and the first hook is assembled to the frame. The second elastic portion includes a second hook and a second elastic arm connected to each other. The second elastic arm is connected to the fixing portion, and the second hook is assembled to the frame. The frame has at least one through hole, and the at least one adjusting member penetrates through the at least one through hole and leans against the optical assembly. When the at least one adjusting member is adjusted, the optical assembly is displaced relative to the frame in a plane perpendicular to an incident optical axis.

In order to achieve one or a portion of or all of the objects or other objects, an embodiment of the disclosure provides a projector including a light source, an adjusting module, a light valve and a projection lens. The light source is adapted to emit a first illumination beam. The adjusting module is disposed on a path of the first illumination beam. The adjusting module includes a frame, an optical assembly, an elastic assembly and at least one adjusting member. The optical assembly is fixed to the elastic assembly. The elastic assembly is detachably assembled on the frame. The elastic assembly includes a fixing portion, a first elastic portion and a second elastic portion. The fixing portion is fixed to the optical assembly. The first elastic portion includes a first hook and a first elastic arm connected to each other. The first elastic arm is connected to the fixing portion, and the first hook is assembled to the frame. The second elastic portion includes a second hook and a second elastic arm connected to each other. The second elastic arm is connected to the fixing portion, and the second hook is assembled to the frame. The frame has at least one through hole, and the at least one adjusting member penetrates through the at least one through hole to lean against the optical assembly. When the at least one adjusting member is adjusted, the optical assembly is displaced relative to the frame in a plane perpendicular to an incident optical axis. The first illumination beam is converted into a second illumination beam by the optical assembly. The light valve is disposed on a path of the second illumination beam. The second illumination beam is converted into an image beam by the light valve. The projection lens is disposed on a path of the image beam, and is adapted to convert the image beam into a projection beam.

Based on the above description, the embodiments of the disclosure have at least one of following advantages or effects. In the adjusting module of the disclosure, when the adjusting member is adjusted, the optical assembly is displaced relative to the frame in the plane perpendicular to the incident optical axis, such that the optical assembly may be displaced to an optimal position to achieve better optical efficiency. In addition, the projector using the adjusting module of the disclosure may have better projection quality.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
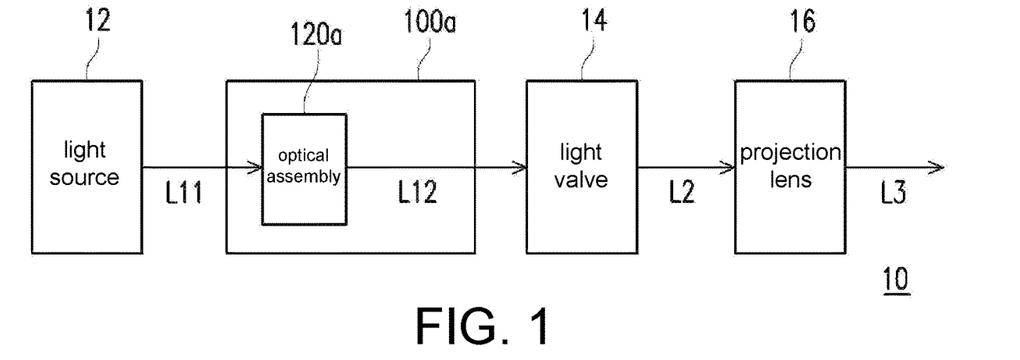
FIG. 1 is a schematic diagram of a projector according to an embodiment of the disclosure.

FIG. 1 is a schematic diagram of a projector according to an embodiment of the disclosure. Referring to FIG. 1, in the embodiment, the projector 10 includes a light source 12, an adjusting module 100a, a light valve 14 and a projection lens 16. The light source 12 is adapted to emit a first illumination beam L11. The adjusting module 100a is disposed on a path of the first illumination beam L11, and the first illumination beam L11 is converted into a second illumination beam L12 by an optical assembly 120a in the adjusting module 100a. The light valve 14 is disposed on a path of the second illumination beam L12, and the second illumination beam L12 is converted into an image beam L2 by the light valve 14. The projection lens 16 is disposed on a path of the image beam L2, and is adapted to convert the image beam L2 into a projection beam L3.

In detail, the light source 12 is, for example, a light-emitting diode (LED) light source, or a laser light source, for example, a laser diode bank. To be specific, any light source that meets a volume requirement in actual design may be used for implementation, which is not limited by the disclosure. The light valve 14 is, for example, a reflective light modulator such as a liquid crystal on silicon panel (LCOS panel), a digital micro-mirror device (DMD), etc. In an embodiment, the light valve 14 is, for example, a transmissive light modulator such as a transparent liquid crystal panel, an electro-optical modulator, a magneto-optic modulator, an acousto-optic modulator (AOM), etc., but the pattern and the type of the light valve 14 are not limited by the embodiment. The projection lens 16 is disposed on the transmission path of the image beam L2, and is configured to project the image beam L2 out of the projector 10. The projection lens 16, for example, includes one optical lens or a combination of a plurality of optical lenses having refractive powers, for example, various combinations of non-planar lenses such as a biconcave lens, a biconvex lens, a concavo-convex lens, a convexo-concave lens, a plano-convex lens, a plano-concave lens, etc. In an embodiment, the projection lens 16 may also include a planar optical lens, which converts the image beam L2 coming from the light valve 14 into the projection beam L3 in a reflective or transmissive manner and projects the same out of the projector 10. The pattern and the type of the projection lens 16 are not limited by the embodiment.

Figure 2A:
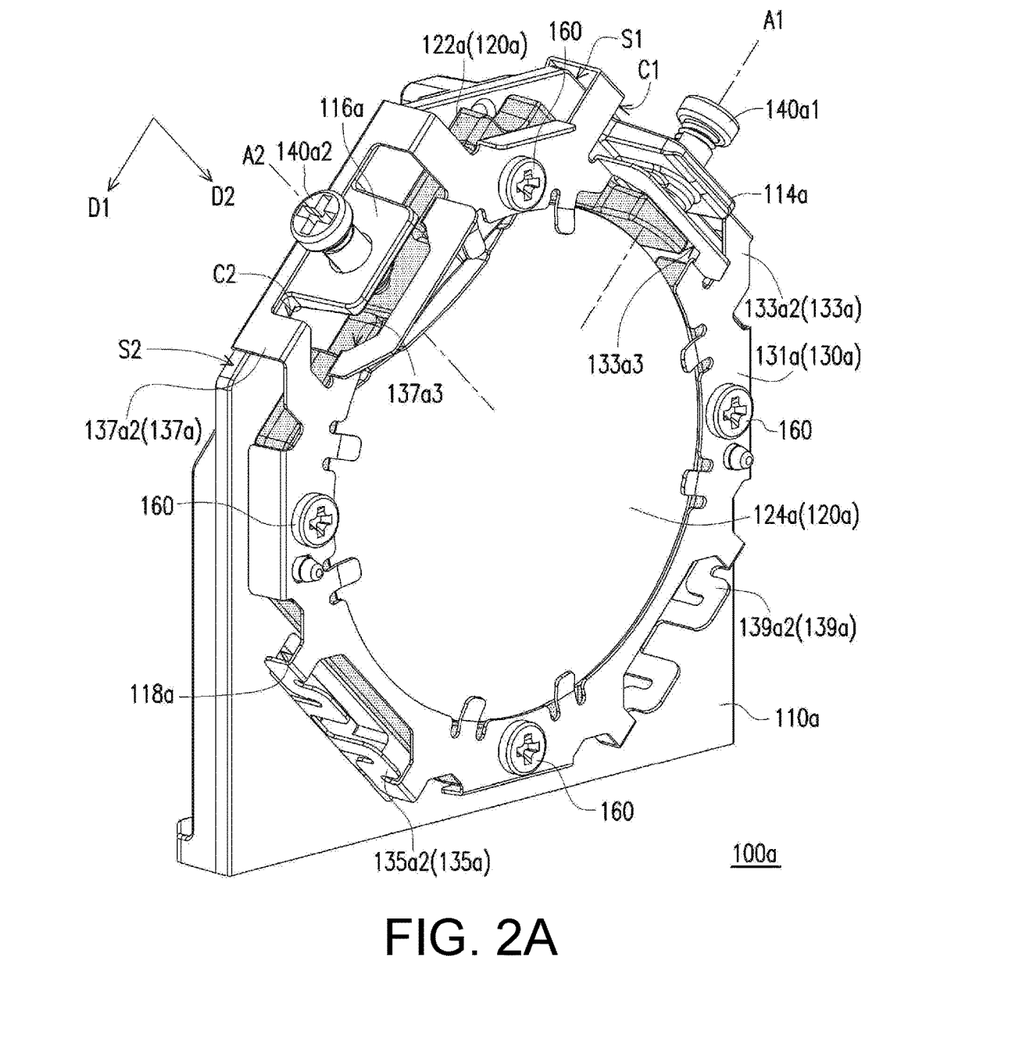
FIG. 2A is a three-dimensional schematic view of an adjusting module of the projector of FIG. 1.
Figure 2B:
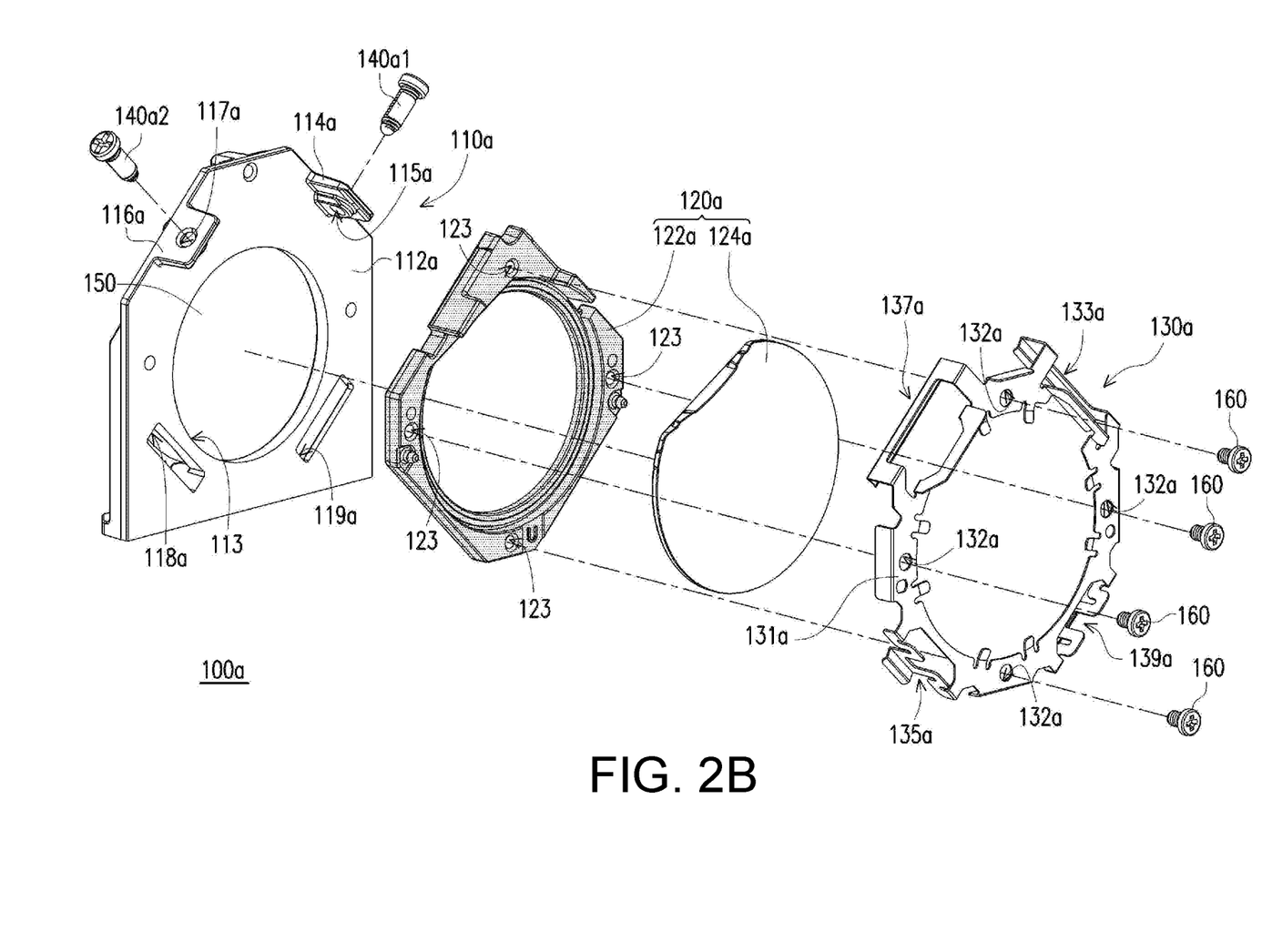
FIG. 2B is a three-dimensional exploded schematic view of the adjusting module of FIG. 2A.
Figure 2C:
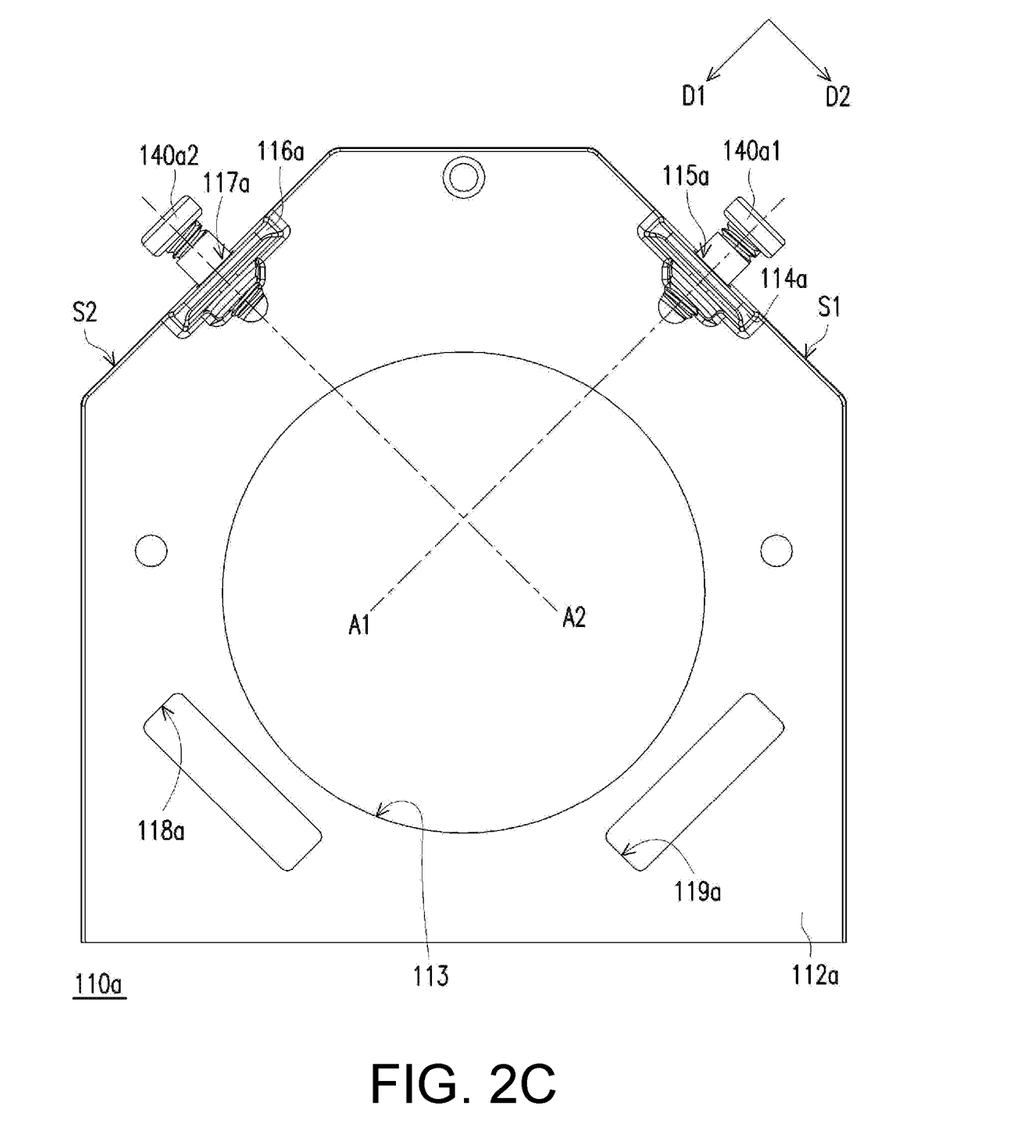
FIG. 2C is an assembling schematic diagram of a frame and an adjusting member of the adjusting module of FIG. 2A.
Figure 2D:
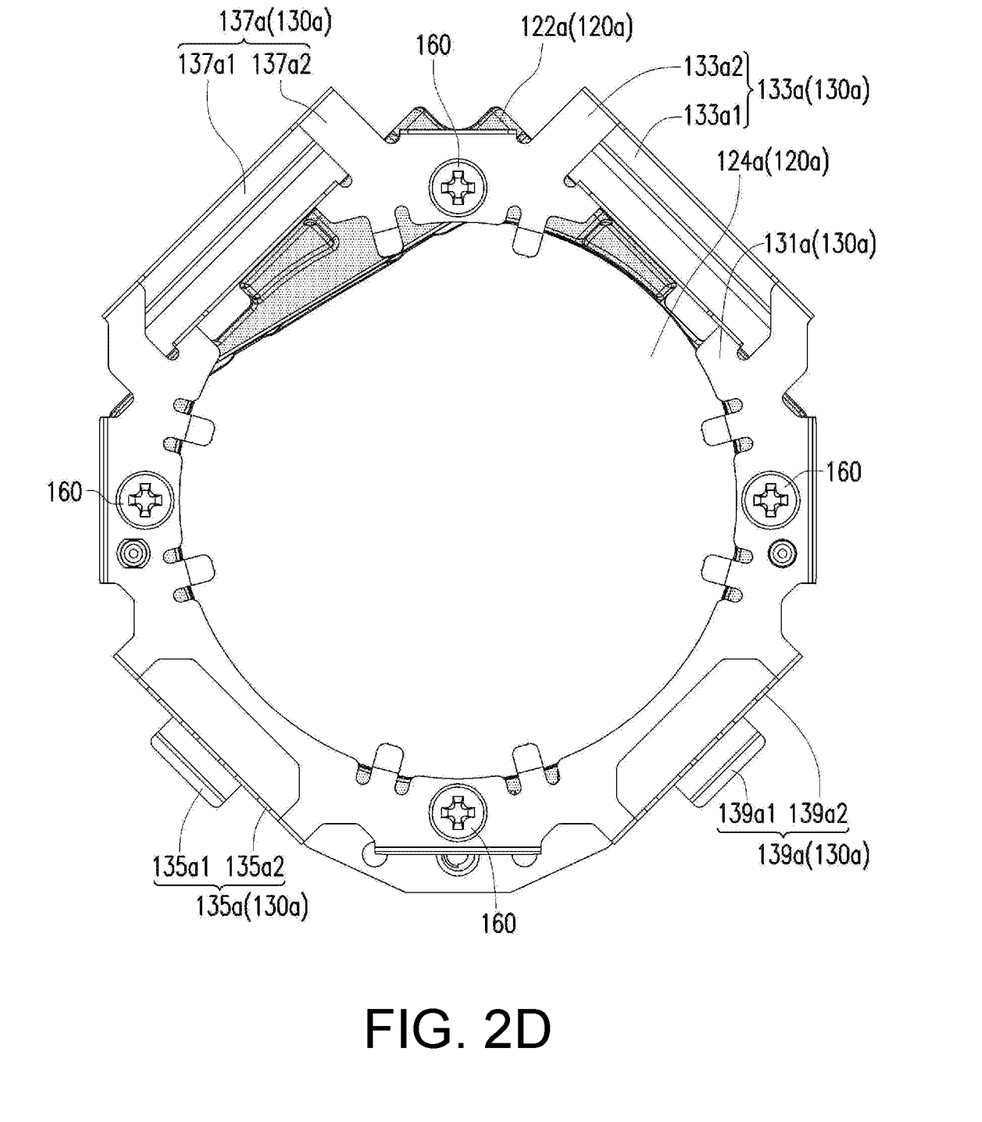
FIG. 2D is an assembling schematic diagram of an elastic assembly and an optical assembly of the adjusting module of FIG. 2A.
Figure 2E:
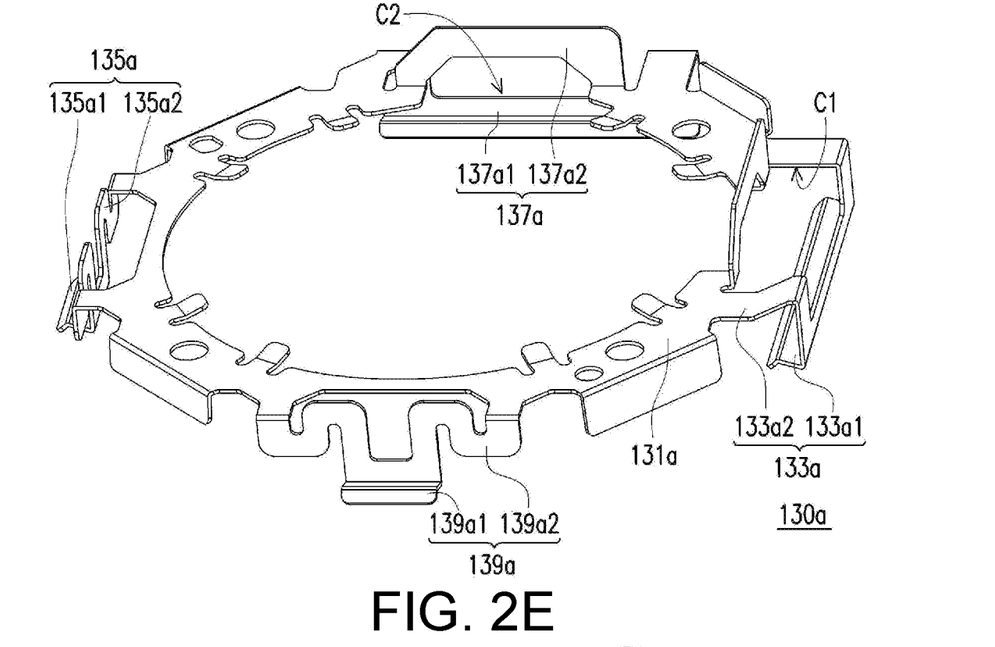
FIG. 2E and FIG. 2F are three-dimensional schematic diagrams of the elastic assembly of the adjusting module of FIG. 2A under different viewing angles.
Figure 2F:
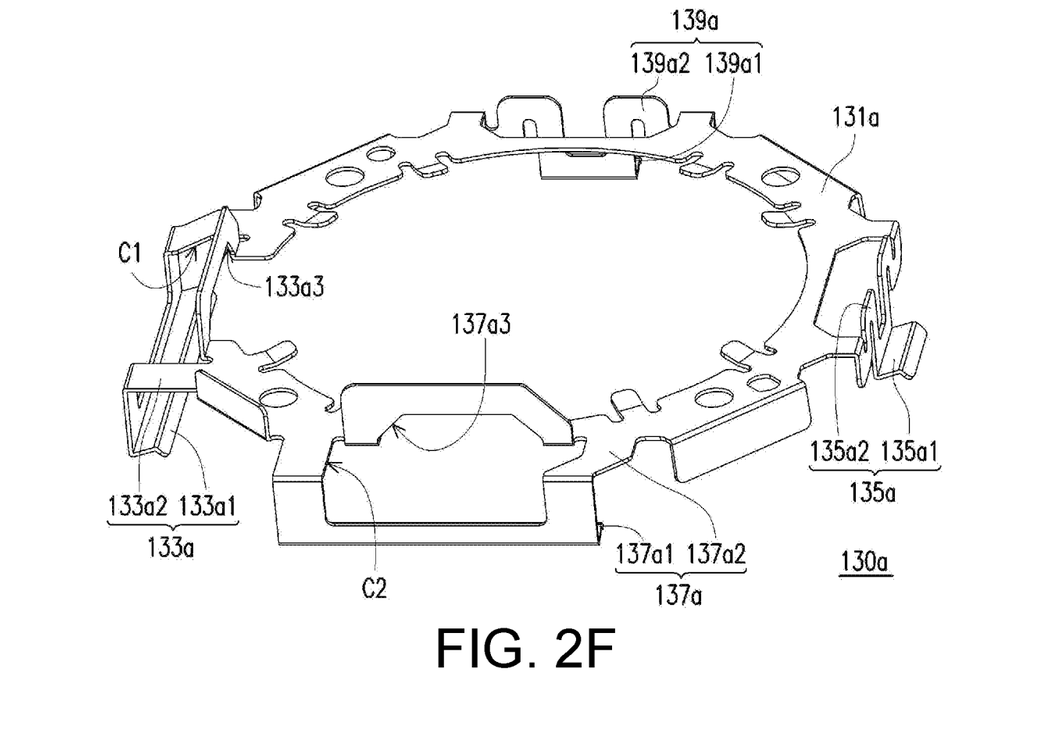
Figure 2G:
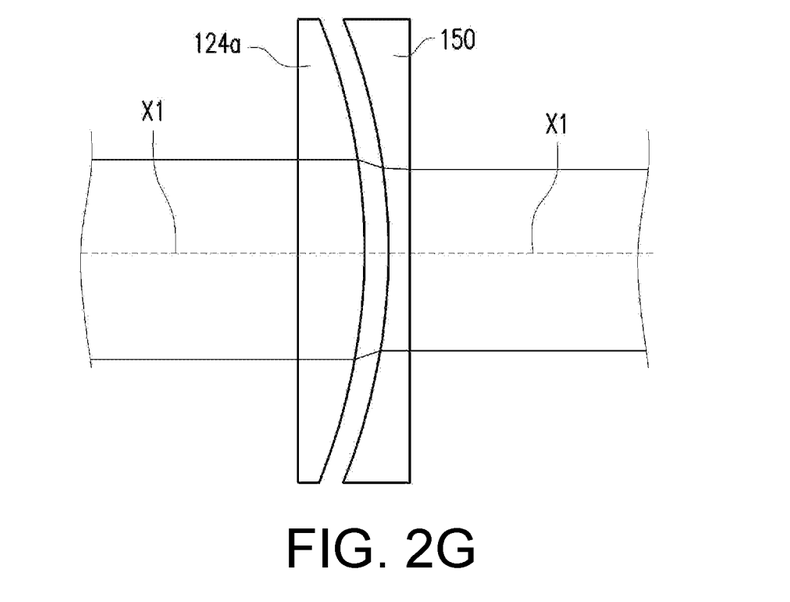
FIG. 2G and FIG. 2H are schematic diagrams illustrating situations before and after the optical assembly of the adjusting module of FIG. 2A is adjusted.
Figure 2H:
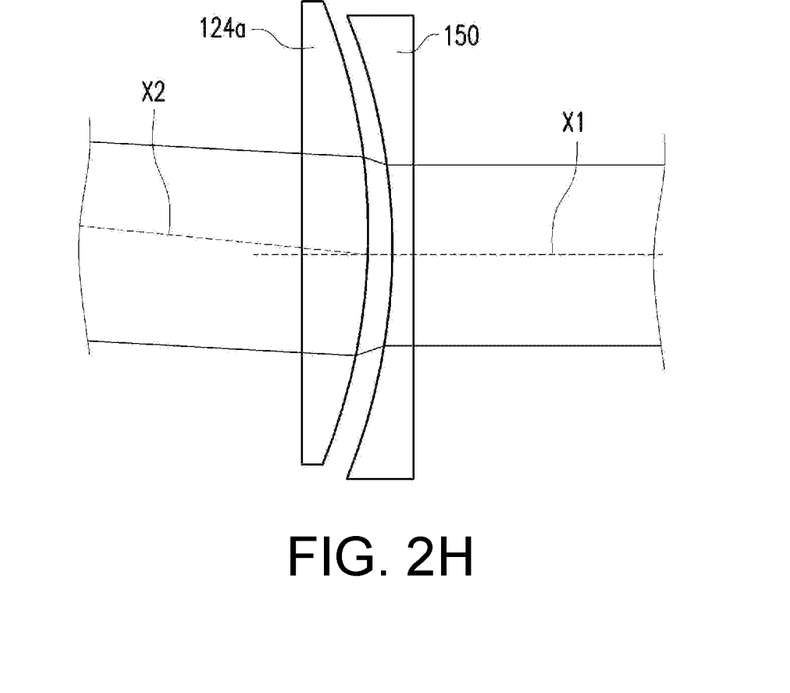

FIG. 2A is a three-dimensional schematic view of the adjusting module of the projector of FIG. 1. FIG. 2B is a three-dimensional exploded schematic view of the adjusting module of FIG. 2A. FIG. 2C is an assembling schematic diagram of a frame and an adjusting member of the adjusting module of FIG. 2A. FIG. 2D is an assembling schematic diagram of an elastic assembly and an optical assembly of the adjusting module of FIG. 2A. FIG. 2E and FIG. 2F are three-dimensional schematic diagrams of the elastic assembly of the adjusting module of FIG. 2A under different viewing angles. FIG. 2G and FIG. 2H are schematic diagrams illustrating situations before and after the optical assembly of the adjusting module of FIG. 2A is adjusted.

Referring to FIG. 2A, FIG. 2B, FIG. 2D, FIG. 2G and FIG. 2H, in the embodiment, the adjusting module 100a includes a frame 110a, an optical assembly 120a, an elastic assembly 130a and at least one adjusting member (for example, a first adjusting screw 140a1). The optical assembly 120a is fixed to the elastic assembly 130a, and the elastic assembly 130a is detachably assembled on the frame 110a. The optical assembly 120a is fixed by the frame 110a and the elastic assembly 130a. The elastic assembly 130a includes a fixing portion 131a, a first elastic portion 133a and a second elastic portion 135a. The fixing portion 131a of the elastic assembly 130a is fixed to the optical assembly 120a. The first elastic portion 133a includes a first hook 133a1 and a first elastic arm 133a2 connected to each other. The first elastic arm 133a2 is connected to the fixing portion 131a, and the first hook 133a1 is assembled to the frame 110a. The second elastic portion 135a includes a second hook 135a1 and a second elastic arm 135a2 connected to each other. The second elastic arm 135a2 is connected to the fixing portion 131a, and the second hook 135a1 is assembled to the frame 110a.

The frame 110a has at least one through hole (for example, a first through hole 115a), and the at least one adjusting member (for example, the first adjusting screw 140a1) penetrates through the first through hole 115a to lean against the optical assembly 120a. To be specific, an inner surface of the first through hole 115a is configured with a thread to enable rotation and movement of the first adjusting screw 140a1. Particularly, when the first adjusting screw 140a1 is adjusted, the optical assembly 120a is displaced relative to the frame 110a in a plane perpendicular to an incident optical axis X1 (shown in FIG. 2G). When the first adjusting screw 140a1 applies a force to the optical assembly 120a in a first direction D1 parallel to a screw axial direction (i.e., a first axial direction A1), the optical assembly 120a may be pushed to displace relative to the frame 110a in the first direction D1. At this moment, the first elastic arm 133a2 and the second elastic arm 135a2 are elastically deformed, and the first elastic portion 133a and the second elastic portion 135a provide a counter force in a direction opposite to the first direction D1. When the first adjusting screw 140a1 is moved in the direction opposite to the first direction D1, the first elastic portion 133a and the second elastic portion 135a may provide a counter force in the direction opposite to the first direction D1 to push the optical assembly 120a to displace relative to the frame 110a in the direction opposite to the first direction D1.

To be specific, the adjusting module 100a of the embodiment further includes a first lens 150, and the frame 110a includes a positioning opening 113. The optical assembly 120a includes a carrier base 122a and a second lens 124a. The first lens 150 is fixed in the positioning opening 113 of the frame 110a, and the carrier base 122a carries the second lens 124a. When the first adjusting screw 140a1 is adjusted, the second lens 124a of the optical assembly 120a is displaced relative to the first lens 150 in a plane perpendicular to the incident optical axis X1. As shown in FIG. 2G and FIG. 2H, since the second lens 124a has a refractive power, when incident light passes through the first lens 150 and enters the second lens 124a at different positions, a light path of emitted light may be changed. When the second lens 124a is displaced relative to the first lens 150 in the plane perpendicular to the incident optical axis X1, an exit optical axis X2 is deviated from the incident optical axis X1, for example, the exit optical axis X2 is not parallel to the incident optical axis X1, by which a position where a light beam enters the integration rod (not shown) through the second lens 124a may be adjusted. In brief, the adjusting module 100a of the embodiment may displace the second lens 124a on the plane perpendicular to the incident optical axis X1, so as to adjust the position where the light beam enters the integration rod (not shown) through the second lens 124a to achieve better optical efficiency.

In detail, referring to FIG. 2A to FIG. 2D, the frame 110a of the embodiment includes a main body portion 112a, and a first side edge S1 and a first slot 118a located on the main body portion 112a. The first slot 118a and the first side edge S1 are provided corresponding to each other. Specifically, the first slot 118a and the first side edge S1 are disposed on two opposite sides of the positioning opening 113, and one side of the first slot 118a is parallel to the first side edge S1. During an assembling process, locking members 160 are used to penetrate through locking holes 132a of the elastic assembly 130a, and are locked to locking holes 123 of the carrier base 122a, such that the elastic assembly 130a is locked to the carrier base 122a of the optical assembly 120a. Thereafter, the optical assembly 120a and the elastic assembly 130a locked together are assembled to the frame 110a together. At this moment, the optical assembly 120a is located between the frame 110a and the elastic assembly 130a. The first hook 133a1 is buckled to the first side edge S1, and the second hook 135a1 is buckled in the first slot 118a, such that the optical assembly 120a and the elastic assembly 130a locked together are assembled with the frame 110a by friction and elastic force to complete assembling the adjusting module 100a. When a position of the optical assembly 120a relative to the frame 110a is to be adjusted, the first adjusting screw 140a1 may be rotated to move the optical assembly 120a in a direction parallel to the first direction D1, so as to adjust the position of the optical assembly 120a, and therefore the light beam may be transmitted to a better position (such as an entrance of the integration rod) to achieve better optical efficiency.

Referring to FIG. 2A to FIG. 2F, in order to further adjust the optical assembly to an appropriate position, the elastic assembly 130a of the embodiment may selectively include a third elastic portion 137a and a fourth elastic portion 139a, and the frame 110a may further include a second slot 119a and at least one protrusion protruding out of the main body portion 112a, such as a first protrusion 114a and a second protrusion 116a. The main body portion 112a further includes the first side edge S1 and a second side edge S2 that are perpendicular to each other, but the disclosure is not limited thereto. In other embodiments, an included angle between the first side edge S1 and the second side edge S2 may be between 60 degrees and 90 degrees. The first protrusion 114a and the second protrusion 116a are respectively located on the first side edge S1 and the second side edge S2. The at least one through hole includes the first through hole 115a and a second through hole 117a. The first protrusion 114a has the first through hole 115a, and the second protrusion 116a has the second through hole 117a. The first slot 118a and the first protrusion 114a are provided corresponding to each other. The second slot 119a and the second protrusion 116a are provided corresponding to each other. In detail, the first slot 118a and the first protrusion 114a are disposed at two opposite sides of the positioning opening 113, and the second slot 119a and the second protrusion 116a are disposed at two opposite sides of the positioning opening 113. To be more specific, one side of the first slot 118a is parallel to the first protrusion 114a (one side of the first slot 118a is parallel to the first side edge S1), and one side of the second slot 119a is parallel to the second protrusion 116a (one side of the second slot 119a is parallel to the second side edge S2).

More specifically, the first hook 133a1 of the embodiment is slidably buckled to the first side edge S1 of the frame 110a and defines a first accommodating space C1 with the first elastic arm 133a2, where the first protrusion 114a is located in the first accommodating space C1. The third elastic portion 137a includes a third hook 137a1 and a third elastic arm 137a2 connected to each other. The third hook 137a1 is slidably buckled to the second side edge S2 of the frame 110a and defines a second accommodating space C2 with the third elastic arm 137a2, where the second protrusion 116a is located in the second accommodating space C2. The second hook 135a1 is slidably buckled in the first slot 118a of the frame 110a. The fourth elastic portion 139a includes a fourth hook 139a1 and a fourth elastic arm 139a2 connected to each other. The fourth hook 139a1 is slidably buckled in the second slot 119a of the frame 110a.

A length of the third elastic arm 137a2 is equal to a length of the first elastic arm 133a2, a length of the second elastic arm 135a2 is greater than the length of the first elastic arm 133a2, and a length of the fourth elastic arm 139a2 is equal to the length of the second elastic arm 135a2. Namely, the length of the first elastic arm 133a2 is smaller than the length of the second elastic arm 135a2, and the length of the third elastic arm 137a2 is smaller than the length of the fourth elastic arm 139a2, such that the elastic assembly 130a may have a sufficient movement margin to prevent the elastic assembly 130a from being pushed and arched when the adjusting member is adjusted. Preferably, the structure of the first elastic portion 133a and the structure of the third elastic portion 137a are substantially the same, and the structure of the second elastic portion 135a and the structure of the fourth elastic portion 139a are substantially the same.

Moreover, referring to FIG. 2A, FIG. 2B and FIG. 2F, the at least one adjusting member of the embodiment includes a first adjusting screw 140a1 and a second adjusting screw 140a2. The first adjusting screw 140a1 penetrates through the first through hole 115a and has a first axial direction A1. The second adjusting screw 140a2 penetrates through the second through hole 117a and has a second axial direction A2. The first axial direction A1 and the second axial direction A2 are perpendicular to each other. More specifically, the first elastic portion 133a has a clear hole 133a3 (as shown in FIG. 2F), and the clear hole 133a3 exposes a part of the carrier base 122a of the optical assembly 120a. The first adjusting screw 140a1 penetrates through the first through hole 115a and the clear hole 133a3 and leans against the carrier base 122a. Similarly, the third elastic portion 137a has a clear hole 137a3 (as shown in FIG. 2F), and the clear hole 137a3 exposes a part of the carrier base 122a of the optical assembly 120a. The second adjusting screw 140a2 penetrates through the second through hole 117a and the clear hole 137a3 and leans against the carrier base 122a.

Referring to FIG. 2A, FIG. 2B and FIG. 2D, when the first adjusting screw 140a1 applies a force to the optical assembly 120a in the first direction D1 parallel to the first axial direction A1, the first adjusting screw 140a1 drives the optical assembly 120a to displace relative to the frame 110a along the first direction D1. The first elastic portion 133a and the second elastic portion 135a provide the counter force along a direction opposite to the first direction D1. The third hook 137a1 of the third elastic portion 137a and the fourth hook 139a2 of the fourth elastic portion 139a are respectively moved on the second side edge S2 and in the second slot 119a along the first direction D1. Similarly, when the second adjusting screw 140a2 applies a force to the optical assembly 120a in the second direction D2 parallel to the second axial direction A2, The second adjusting screw 140a2 drives the optical assembly 120a to displace relative to the frame 110a along the second direction D2. The third elastic portion 137a and the fourth elastic portion 139a provide the counter force along a direction opposite to the second direction D2. The first hook 133a1 of the first elastic portion 133a and the second hook 135a1 of the second elastic portion 135a are respectively moved on the first side edge S1 and in the first slot 118a along the second direction D2. In this way, the second lens 124a may be displaced relative to the first lens 150 in a plane perpendicular to the incident optical axis X1, so as to adjust a position where the light beam enters the integration rod (not shown) through the second lens 124a.

During the assembling process, the optical assembly 120a and the elastic assembly 130a locked together may be assembled to the frame 110a together. The first hook 133a1 and the third hook 137a1 are respectively slidably bucked to the first side edge S1 and the second side edge S2, and the second hook 135a1 and the fourth hook 139a1 are respectively slidably buckled in the first slot 118a and the second slot 119a, the optical assembly 120a and the elastic assembly 130a locked together are assembled to the frame 110a by friction and elastic force to complete assembling the adjusting module 100a. When a position of the optical assembly 120a relative to the frame 110a is to be adjusted, the first adjusting screw 140a1 or/and the second adjusting screw 140a2 may be rotated to adjust the optical assembly 120a to an optimal position, such that the light beam may be transmitted to a correct position (such as an entrance of the integration rod) to achieve better optical efficiency.

In brief, in the adjusting module 100a of the embodiment, the elastic assembly 130a may drive the optical assembly 120a to displace relative to the frame 110a in a plane perpendicular to the incident optical axis X1, such that the optical assembly 120a may be displaced to an optimal position to achieve better optical efficiency. Moreover, the projector 10 using the adjusting module 100a may have better projection quality.

Figure 2I:
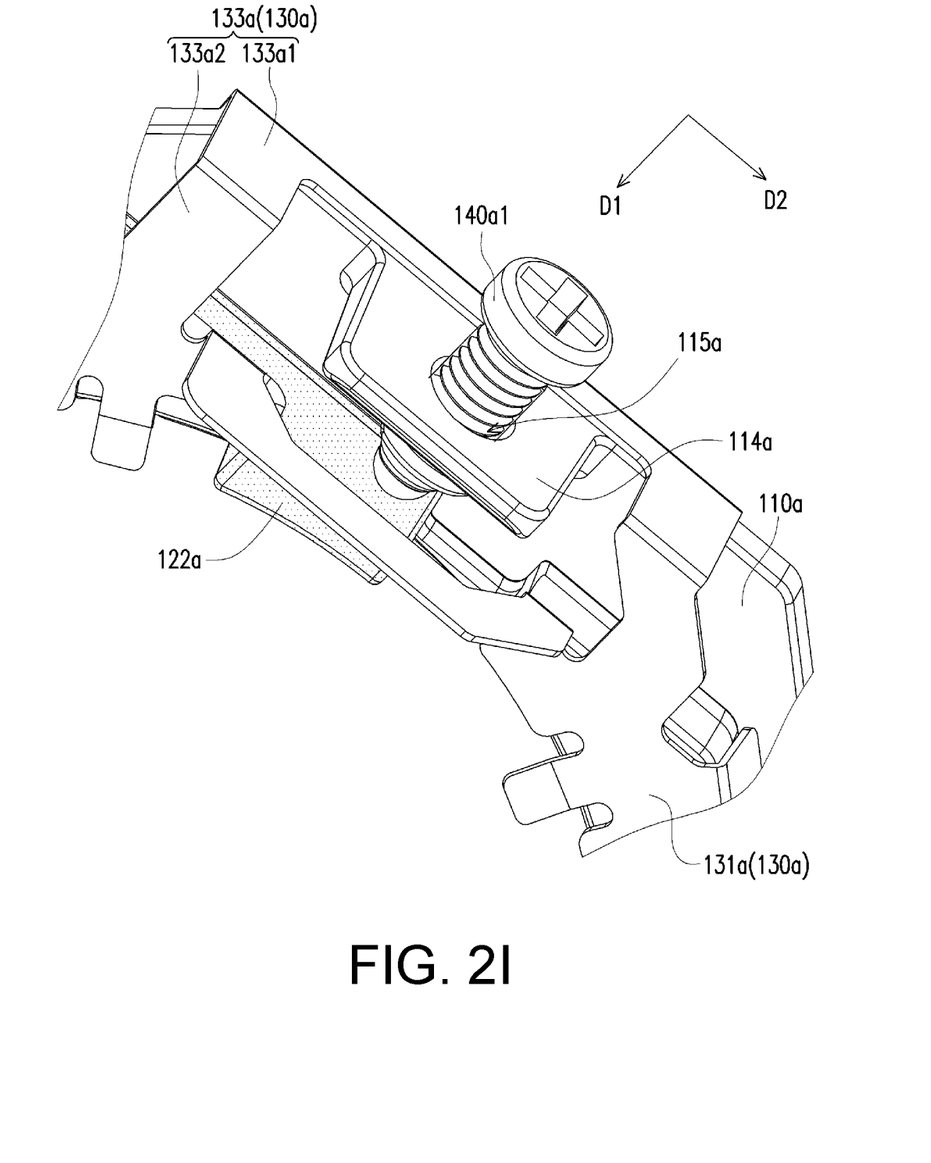
FIG. 2I is a schematic diagram of the frame, the adjusting member, the optical assembly and the elastic assembly of the adjusting module of FIG. 2A under a different viewing angle.

FIG. 2I is a schematic diagram of the frame, the adjusting member, the optical assembly and the elastic assembly of the adjusting module of FIG. 2A under a different viewing angle. Referring to FIG. 2A to FIG. 2I, the first adjusting screw 140a1 is, in order, through the first through hole 115a of the first protrusion 114a of the frame 110a and an opening formed by the first hook 133a1 of the elastic assembly 130a and first elastic arm 133a2 of the elastic assembly 130a. The first adjusting screw 140a1 leans against the carrier base 122a of the optical assembly 120a. When the first adjusting screw 140a1 applies a force to the optical assembly 120a in a first direction D1 parallel to a screw axial direction (i.e., a first axial direction A1), the optical assembly 120a may be pushed to displace relative to the frame 110a in the first direction D1. At this moment, the first elastic arm 133a2 and the second elastic arm 135a2 are elastically deformed, and the first elastic portion 133a and the second elastic portion 135a provide a counter force in a direction opposite to the first direction D1. When the first adjusting screw 140a1 is moved in the direction opposite to the first direction D1, the first elastic portion 133a and the second elastic portion 135a may provide a counter force in the direction opposite to the first direction D1 to push the optical assembly 120a to displace relative to the frame 110a in the direction opposite to the first direction D1.

It should be noted that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
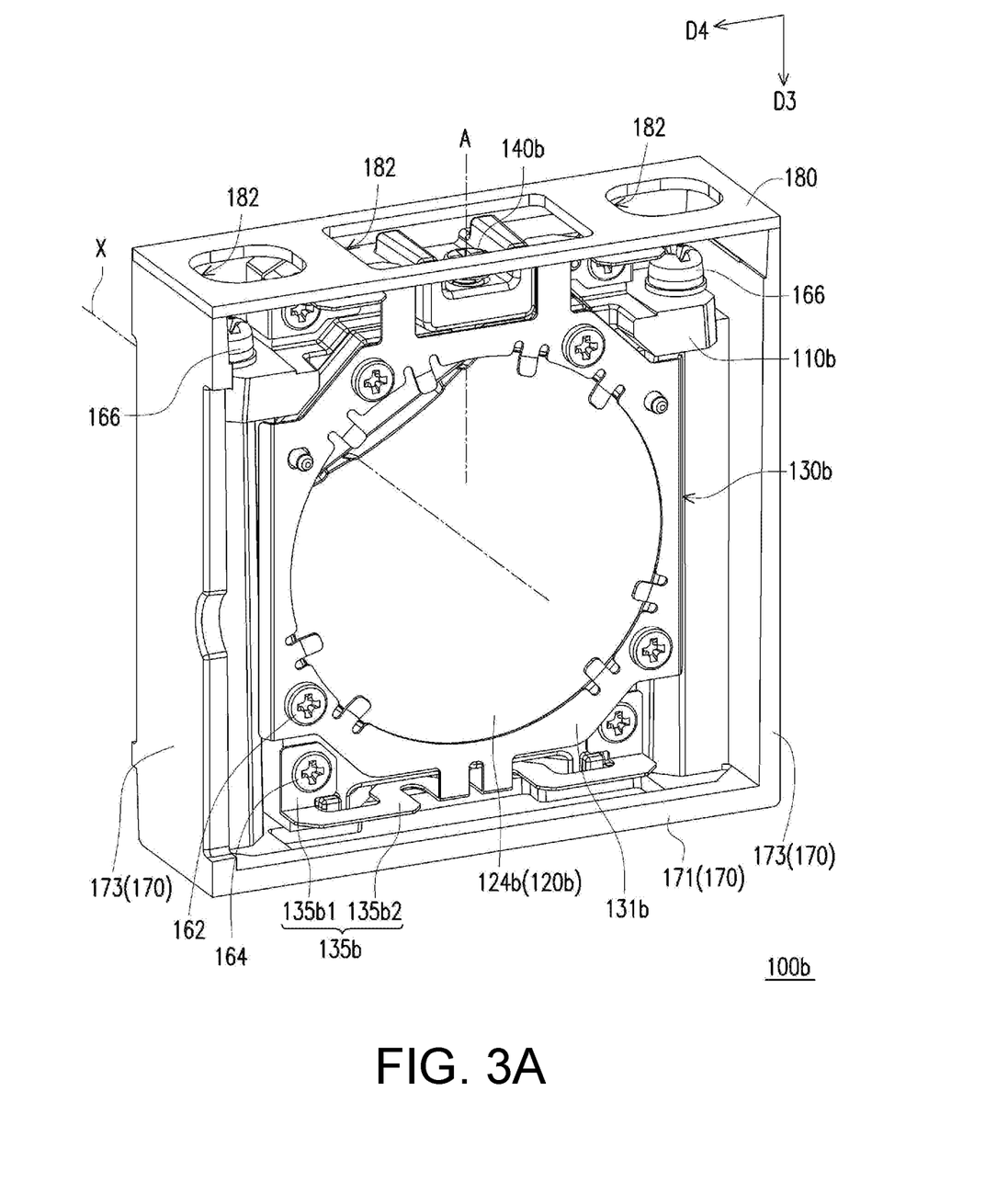
FIG. 3A is a three-dimensional schematic view of an adjusting module according to another embodiment of the disclosure.
Figure 3B:
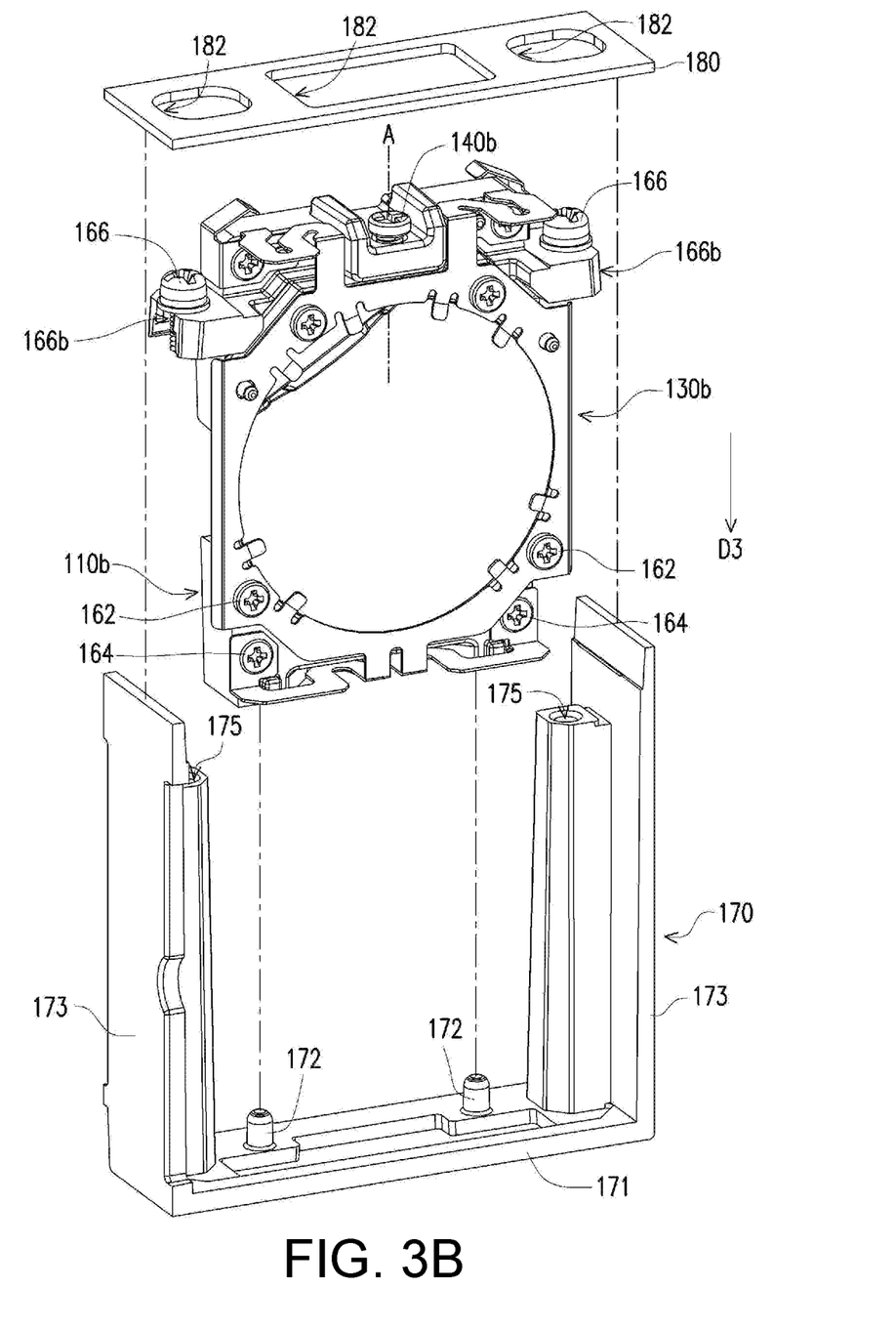
FIG. 3B and FIG. 3C are partial three-dimensional exploded schematic views of the adjusting module of FIG. 3A in different viewing angles.
Figure 3C:
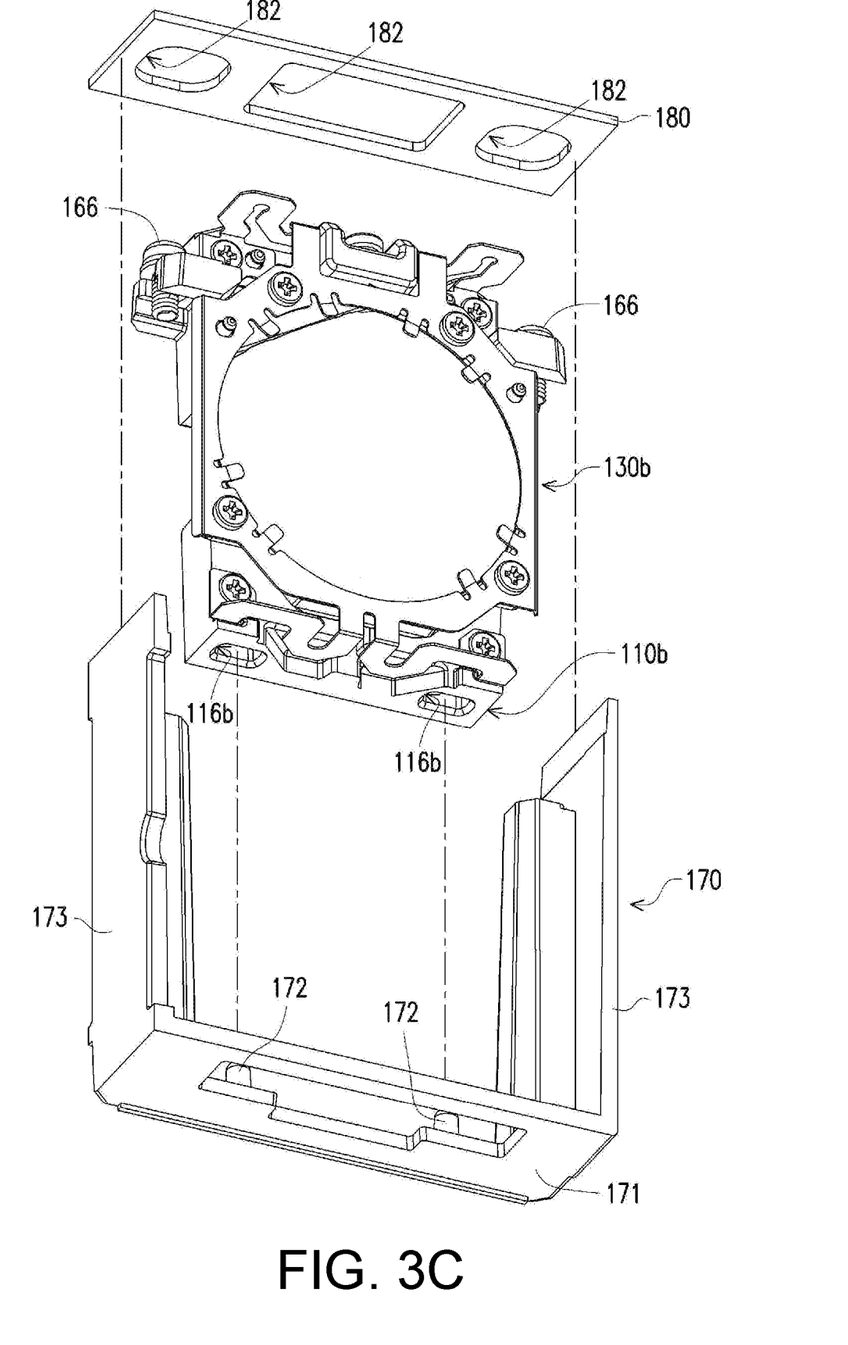
Figure 3D:
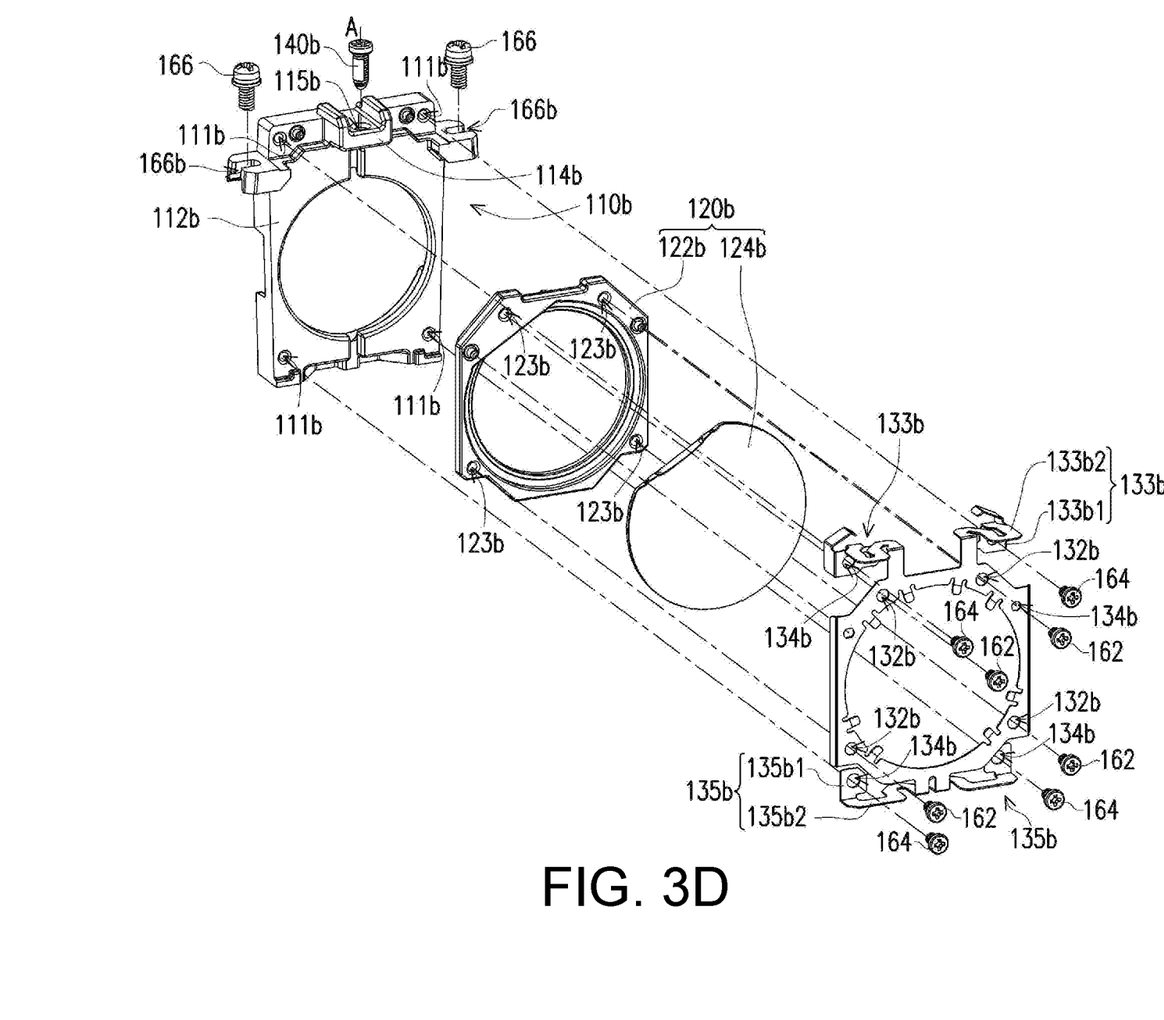
FIG. 3D is a three-dimensional exploded schematic view of a frame, an optical assembly, an elastic assembly, an adjusting member and locking members of the adjusting module of FIG. 3A.

FIG. 3A is a three-dimensional schematic view of an adjusting module according to another embodiment of the disclosure. FIG. 3B and FIG. 3C are partial three-dimensional exploded schematic views of the adjusting module of FIG. 3A in different viewing angles. FIG. 3D is a three-dimensional exploded schematic view of a frame, an optical assembly, an elastic assembly, an adjusting member and locking members of the adjusting module of FIG. 3A.

Referring to FIG. 3A, FIG. 3B, FIG. 3C and FIG. 3D, the adjusting module 100b of the embodiment includes a frame 110b, an optical assembly 120b, an elastic assembly 130b and an adjusting member (for example, an adjusting screw 140b). The optical assembly 120b is fixed to the elastic assembly 130b, and the elastic assembly 130b is detachably assembled on the frame 110b. The elastic assembly 130b includes a fixing portion 131b, a first elastic portion 133b, and a second elastic portion 135b. The fixing portion 131b of the elastic assembly 130b is fixed to the optical assembly 120b. The first elastic portion 133b includes a first hook 133b1 and a first elastic arm 133b2 connected to each other. The first elastic arm 133b2 is connected to the fixing portion 131b, and the first hook 133b1 is assembled to the frame 110b. The second elastic portion 135b includes a second hook 135b1 and a second elastic arm 135b2 connected to each other. The second elastic arm 135b2 is connected to the fixing portion 131b, and the second hook 135b1 is assembled to the frame 110b. The frame 110b has a through hole 115b, and the adjusting screw 140b penetrates through the through hole 115b and leans against the optical assembly 120b.

Particularly, when the adjusting screw 140b is adjusted, the elastic assembly 130b drives the optical assembly 120b to displace relative to the frame 110b in a plane perpendicular to an incident optical axis X. When the adjusting screw 140b applies a force to the optical assembly 120b in a first direction D3 parallel to a screw axial direction A, the optical assembly 120b may be pushed to displace relative to the frame 110b in the first direction D3. At this moment, the first elastic arm 133b2 and the second elastic arm 135b2 are elastically deformed, and the first elastic portion 133b and the second elastic portion 135b provide a counter force in a direction opposite to the first direction D3.

To be more specific, the first hook 133b1 and the second hook 135b1 of the embodiment are respectively fixed to the frame 110b. The frame 110b includes a main body portion 112b and a protrusion 114b protruding out of the main body portion 112b. The protrusion 114b is located on a side of the main body portion 112b, and the protrusion 114b has a through hole 115b, and the adjusting screw 140b penetrates through the through hole 115b and leans against the optical assembly 120b. An amount of the first elastic arms 133b2 is two, and the two first elastic arms 133b2 are located at two sides of the adjusting screw 140b. An amount of the second elastic arms 135b2 is two, and the two second elastic arms 135b2 are located opposite to the two first elastic arms 133b2, where a length of each first elastic arm 133b2 is greater than a length of each second elastic arm 135b2. When the adjusting screw 140b applies a force on the optical assembly 120b in the first direction D3 parallel to the screw axial direction A, the optical assembly 120b may be driven to displace relative to the frame 110b in the first direction D3. At this moment, the first elastic arm 133b2 of the first elastic portion 133b and the second elastic arm 135b2 of the second elastic portion 135b are elastically deformed to provide a counter force in a direction opposite to the first direction D3.

To be specific, the adjusting module 100b of the embodiment further includes a carrier member 170, where the carrier member 170 includes at least one bolt (two bolts 172 are schematically illustrated). The frame 110b has at least one slot (two slots 116b are schematically illustrated), and the slots 116b and the protrusion 114b are respectively located at two opposite sides of the main body portion 112b. Particularly, the bolts 172 are slidably located in the slots 116b to drive the optical assembly 120b to move in a second direction D4 perpendicular to the first direction D3. The carrier member 170 is, for example, an optical engine casing or a plate member disposed between the optical engine casing and the frame, which is not limited by the disclosure. Moreover, the carrier member 170 of the embodiment further includes a bottom plate 171 and two side plates 173 connected to the bottom plate 171. The side plates 173 respectively have a positioning hole 175, and the frame 110b has two position limiting portions 166b opposite to each other. Locking members 166 may respectively penetrate through the position limiting portions 166b for being positioned in the positioning holes 175 of the side plates 173. In addition, the adjusting module 100b of the embodiment further includes a cover plate 180, where the cover plate 180 covers the side plates 173 of the carrier member 170, and has a plurality of adjusting holes 182 exposing the adjusting screw 140b and the locking members 166.

During the assembling process, locking members 162 may first penetrate through locking holes 132b of the elastic assembly 130b for being locked to locking holes 123b of the carrier base 122b of the optical assembly 130b, so as to lock the elastic assembly 130b on the carrier base 122b, and locking members 164 may penetrate through locking holes 134b of the elastic assembly 130b and locking holes 111b of the frame 110b to lock the elastic assembly 130b on the frame 110b. Particularly, the locking holes 134b are, for example, configured on the first hook 133b1 and the second hook 135b1. At this point, the optical assembly 120b is located between the frame 110b and the elastic assembly 130b. Then, the frame 110b, the optical assembly 120b, and the elastic assembly 130b that are fixed together are placed on the bottom plate 171 of the carrier member 170, where the bolts 172 of the carrier member 170 are slidably disposed in the slots 116b of the frame 110b. Thereafter, the locking members 166 may respectively penetrate through the position limiting portions 166b of the frame 110b for being positioned in the positioning holes 175 of the side plates 173 of the carrier member 170. Finally, the cover plate 180 is assembled to the side plates 173 of the carrier member 170 to complete assembling the adjusting module 100b.

When a position of the optical assembly 120b relative to the frame 110b in the first direction D3 is to be adjusted, the adjusting screw 140b may be rotated to push the optical assembly 120b to displace relative to the frame 110b in the first direction D3, and the first elastic arm 133b2 and the second elastic arm 135b2 are elastically deformed, so that the first elastic portion 133b and the second elastic portion 135b provide a counter force in a direction opposite to the first direction D3. When the adjusting screw 140b is moved in the direction opposite to the first direction D3, the first elastic portion 133b and the second elastic portion 135b may provide a counter force in the direction opposite to the first direction D3 to push the optical assembly 120a to displace relative to the frame 110b in the direction opposite to the first direction D3. When the position of the optical assembly 120b in the second direction D4 is to be adjusted, the carrier member 170 may be pushed in the second direction D4, so that the bolts 172 of the carrier member 170 may slide in the slots 116b of the frame 110b to drive the optical assembly 120b to move in the second direction D4. In this way, the optical assembly 120b may be adjusted to an optimal position, and the light beam may be transmitted to a correct position (such as the entrance of the integration rod) to achieve optimal optical efficiency. Particularly, in the embodiment, the optical assembly 120b includes the elastic assembly 130b and the carrier member 170, such that the optical assembly 120b may be adjusted and moved in multiple directions, but the disclosure is not limited thereto. In other embodiments, the optical assembly does not include the carrier member 170, and the elastic assembly 130b may be used to adjust the position of the optical assembly in one direction to achieve better optical efficiency.

In summary, the embodiments of the disclosure have at least one of following advantages or effects. In the adjusting module of the disclosure, when the adjusting member is adjusted, the optical assembly is displaced relative to the frame in the plane perpendicular to the incident optical axis, such that the optical assembly may be displaced to an optimal position to achieve better optical efficiency. In addition, the projector using the adjusting module of the disclosure may have better projection quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An adjusting module, comprising: a frame, an optical assembly, an elastic assembly and at least one adjusting member, wherein
   the optical assembly is fixed to the elastic assembly;
   the elastic assembly is detachably assembled on the frame, and the elastic assembly comprises a fixing portion, a first elastic portion and a second elastic portion, wherein:
     the fixing portion is fixed to the optical assembly;
     the first elastic portion comprises a first hook and a first elastic arm connected to each other, wherein the first elastic arm is connected to the fixing portion, and the first hook is assembled to the frame; and
     the second elastic portion comprises a second hook and a second elastic arm connected to each other, wherein the second elastic arm is connected to the fixing portion, and the second hook is assembled to the frame;
   the frame has at least one through hole, and the at least one adjusting member penetrates through the at least one through hole and leans against the optical assembly; and
   when the at least one adjusting member is adjusted, the optical assembly is displaced relative to the frame in a plane perpendicular to an incident optical axis.

2. The adjusting module as claimed in claim 1, further comprising: a first lens,
   the frame comprises a positioning opening, and the optical assembly comprises a carrier base and a second lens, the first lens is fixed in the positioning opening, the carrier base carries the second lens, and when the at least one adjusting member is adjusted, the second lens of the optical assembly is displaced relative to the first lens in the plane perpendicular to the incident optical axis.

3. The adjusting module as claimed in claim 1, wherein the frame comprises a main body portion and a first protrusion and a second protrusion protruding out of the main body portion, the main body portion comprises a first side edge and a second side edge perpendicular to each other, the first protrusion and the second protrusion are respectively located at the first side edge and the second side edge, the at least one through hole comprises a first through hole and a second through hole, the first protrusion has the first through hole, and the second protrusion has the second through hole.

4. The adjusting module as claimed in claim 3, wherein the frame has a first slot and a second slot, the first slot and the first protrusion are disposed corresponding to each other, and the second slot and the second protrusion are disposed corresponding to each other, and the elastic assembly further comprises a third elastic portion and a fourth elastic portion, wherein:
   the first hook is slidably buckled to the first side edge and defines a first accommodating space with the first elastic arm, and the first protrusion is located in the first accommodating space;
   the third elastic portion comprises a third hook and a third elastic arm connected to each other, wherein the third hook is slidably buckled to the second side edge and defines a second accommodating space with the third elastic arm, and the second protrusion is located in the second accommodating space;

the second hook is slidably buckled in the first slot; and the fourth elastic portion comprises a fourth hook and a fourth elastic arm connected to each other, wherein the fourth hook is slidably buckled in the second slot.

5. The adjusting module as claimed in claim 4, wherein a length of the third elastic arm is equal to a length of the first elastic arm, a length of the second elastic arm is greater than the length of the first elastic arm, and a length of the fourth elastic arm is equal to the length of the second elastic arm.

6. The adjusting module as claimed in claim 4, wherein the at least one adjusting member comprises a first adjusting screw and a second adjusting screw, the first adjusting screw penetrates through the first through hole and has a first axial direction, and the second adjusting screw penetrates through the second through hole and has a second axial direction, wherein the first axial direction and the second axial direction are perpendicular to each other.

7. The adjusting module as claimed in claim 6, wherein when the first adjusting screw applies a force to the optical assembly in a first direction parallel to the first axial direction, the third hook of the third elastic portion and the fourth hook of the fourth elastic portion are respectively moved on the second side edge and in the second slot along the first direction to drive the optical assembly to displace relative to the frame in the first direction, and the first elastic portion and the second elastic portion provide a counter force in a direction opposite to the first direction.

8. The adjusting module as claimed in claim 7, wherein when the second adjusting screw applies a force to the optical assembly in a second direction parallel to the second axial direction, the first hook of the first elastic portion and the second hook of the second elastic portion are respectively moved on the first side edge and in the first slot along the second direction to drive the optical assembly to displace relative to the frame in the second direction, and the third elastic portion and the fourth elastic portion provide a counter force in a direction opposite to the second direction.

9. The adjusting module as claimed in claim 1, wherein the first hook and the second hook are respectively fixed to the frame, the frame comprises a main body portion and a protrusion protruding out of the main body portion, the protrusion is located on a side of the main body portion, the at least one through hole is a through hole, and the at least one adjusting member is an adjusting screw, and the protrusion has the through hole, and the adjusting screw penetrates through the through hole and leans against the optical assembly; wherein an amount of the first elastic arms is two, and the two first elastic arms are located at two sides of the adjusting screw;

an amount of the second elastic arms is two, and the two second elastic arms are located opposite to the two first elastic arms, and a length of the two first elastic arms is greater than a length of the two second elastic arms; and when the adjusting screw applies a force on the optical assembly in a first direction parallel to a screw axial direction, the optical assembly is driven to displace relative to the frame in the first direction, and the two first elastic arms and the two second elastic arms are elastically deformed to provide a counter force in a direction opposite to the first direction.

10. The adjusting module as claimed in claim 9, wherein the adjusting module further comprises a carrier member, the carrier member comprises at least one bolt, and the frame has at least one slot, the at least one slot and the protrusion are respectively located at two opposite sides of the main body portion, the at least one bolt is slidably located in the at least one slot to drive the optical assembly to move in a second direction perpendicular to the first direction.

11. A projector, comprising a light source, an adjusting module, a light valve and a projection lens, wherein the light source is adapted to emit a first illumination beam;

the adjusting module is disposed on a path of the first illumination beam, and the adjusting module comprises a frame, an optical assembly, an elastic assembly and at least one adjusting member, wherein the optical assembly is fixed to the elastic assembly;

the elastic assembly is detachably assembled on the frame, and the elastic assembly comprises a fixing portion, a first elastic portion and a second elastic portion, wherein:

the fixing portion is fixed to the optical assembly;

the first elastic portion comprises a first hook and a first elastic arm connected to each other, wherein the first elastic arm is connected to the fixing portion, and the first hook is assembled to the frame; and the second elastic portion comprises a second hook and a second elastic arm connected to each other, wherein the second elastic arm is connected to the fixing portion, and the second hook is assembled to the frame;

the frame has at least one through hole, and the at least one adjusting member penetrates through the at least one through hole to lean against the optical assembly; and when the at least one adjusting member is adjusted, the optical assembly is displaced relative to the frame in a plane perpendicular to an incident optical axis, and the first illumination beam is converted into a second illumination beam by the optical assembly;

the light valve is disposed on a path of the second illumination beam, and the second illumination beam is converted into an image beam by the light valve; and the projection lens is disposed on a path of the image beam, and is adapted to convert the image beam into a projection beam.

* * * * *